(12) United States Patent
Halfmann et al.

(10) Patent No.: US 8,744,339 B2
(45) Date of Patent: Jun. 3, 2014

(54) WIRELESS TELECOMMUNICATION SYSTEM INCLUDING A BASE STATION, RELAY NODE AND METHOD FOR GLOBAL FAIR SCHEDULING

(75) Inventors: Ruediger Halfmann, Otterberg (DE); Thomas Haustein, Potsdam (DE); Andreas Ibing, Berlin (DE); Wolfgang Zirwas, München (DE)

(73) Assignees: Nokia Siemens Networks Oy, Espoo (FI); Fraunhofer Gesellschaft zur Forderung der angewandten Forschung e.V., Munich (DE)

( * ) Notice: Subject to any disclaimer, the term of this patent is extended or adjusted under 35 U.S.C. 154(b) by 840 days.

(21) Appl. No.: 12/744,364
(22) PCT Filed: Oct. 31, 2008
(86) PCT No.: PCT/EP2008/064815
§ 371 (c)(1), (2), (4) Date: Jun. 14, 2010
(87) PCT Pub. No.: WO2009/068413
PCT Pub. Date: Jun. 4, 2009

(65) Prior Publication Data
US 2010/0255773 A1 Oct. 7, 2010

(30) Foreign Application Priority Data
Nov. 27, 2007 (EP) .................... 07022968

(51) Int. Cl.
*H04B 3/36* (2006.01)
*H04B 7/14* (2006.01)
(52) U.S. Cl.
USPC ............. 455/7; 455/13.4; 455/15; 455/343.4; 455/517; 370/315; 370/429; 370/501
(58) Field of Classification Search
USPC .......... 455/7, 9, 11.1, 13.4, 15, 16, 18, 343.4, 455/428, 403, 509, 517, 522, 574; 370/315, 370/328, 329, 338, 429, 501
See application file for complete search history.

(56) References Cited

U.S. PATENT DOCUMENTS

2004/0190476 A1   9/2004   Bansal et al. ................. 370/338
(Continued)

FOREIGN PATENT DOCUMENTS

WO   WO-03/019878 A2   3/2003
WO   WO 2007/053950 A1   5/2007

OTHER PUBLICATIONS

3GPP TS 36.300 V8.0.0(Mar. 2007); $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); Mar. 2007; whole document (82 pages).

(Continued)

*Primary Examiner* — Shaima Q Aminzay
(74) *Attorney, Agent, or Firm* — Harrington & Smith

(57) ABSTRACT

The invention relates to a wireless telecommunication system including at least one Base Station (BS) for communicating with at least one multihop Relay Node (RN) using a wireless link of a first type and with at least one local user equipment unit (UE) located within a range of the base station (BS) using at least one wireless link of a second type, wherein the wireless link of the first type is used to transmit a combined data flow encapsulating multiple individual data flows relating to different services and/or remote user equipment (UE) units. In order to enable a global fair scheduling, the base station (BS) is further configured to receive at least one local fairness parameter from the multihop relay node (RN), said local fairness parameter representing a fairness of the distribution of radio resources of the relay node (RN) over the individual data flows in the combined data flow and to execute a global fair scheduling procedure for determining a fair distribution of available radio resources of the base station (BS) over said at least one wireless link of the first type and said at least one wireless link of the second type, wherein the local fairness parameter is used as a parameter in said global fair scheduling procedure.

10 Claims, 1 Drawing Sheet

(56) References Cited

U.S. PATENT DOCUMENTS

| | | | |
|---|---|---|---|
| 2007/0072604 A1* | 3/2007 | Wang | 455/428 |
| 2007/0150928 A1 | 6/2007 | Hottinen | 725/127 |
| 2007/0201400 A1* | 8/2007 | Kang et al. | 370/329 |
| 2009/0016290 A1* | 1/2009 | Chion et al. | 370/329 |
| 2009/0197624 A1* | 8/2009 | Kwak et al. | 455/517 |
| 2013/0090055 A1* | 4/2013 | Pitakdumrongkija et al. | 455/9 |

OTHER PUBLICATIONS

Kim, H. et al.; "A Proportional Fair Scheduling for Multicarrier Transmission Systems"; IEEE Communications Letters, vol. 9, No. 3; Mar. 2005; pp. 210-212.

* cited by examiner

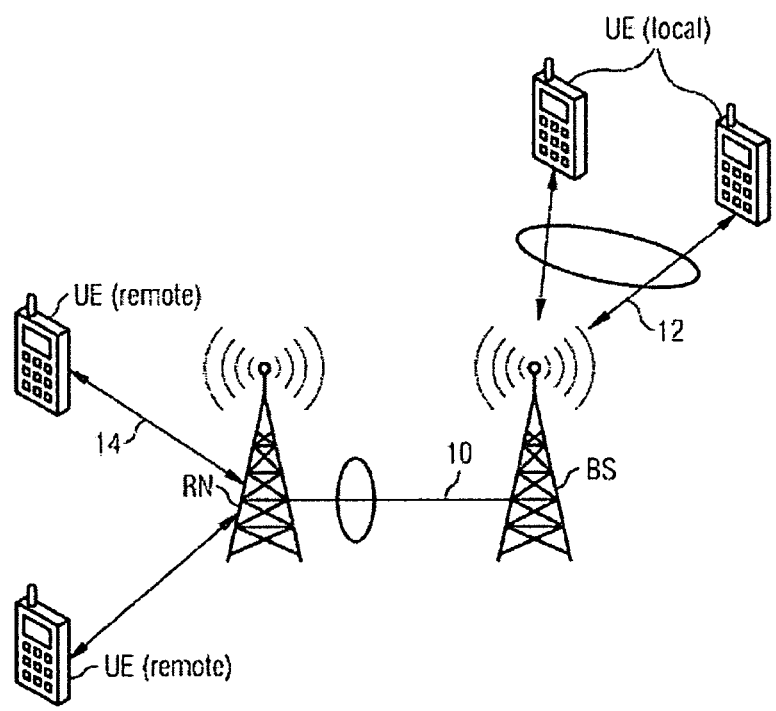

WIRELESS TELECOMMUNICATION SYSTEM INCLUDING A BASE STATION, RELAY NODE AND METHOD FOR GLOBAL FAIR SCHEDULING

I. FIELD OF THE INVENTION

The invention relates to cellular or hierarchical wireless telecommunication systems, to a base station, a relay node for use in such systems and to a method for global fair scheduling.

II. TECHNICAL BACKGROUND OF THE INVENTION

In future cellular systems like Long-Term-Evolution (LTE) Networks as described e.g. in the 3GPP technical specification TS 36.300v800, evolved UMTS Terrestrial Radio Access Networks (e-UTRAN) have been proposed. For such systems, the possibility of using multihop Relay Nodes (RN) for providing User Equipment (UE) devices such as cellular phones, handheld computers or the like with wireless access to a core network has been discussed but not yet realized. These multihop relay nodes would be connected to a Base Station (BS) of the Network via a wireless link. The multihop relay nodes would provide range extension (coverage) and capacity enhancement (through SNR improvement) for the network and for the user equipment devices.

In such network architectures, each multihop relay node would be hierarchically associated to a higher level relay node or to the base station. This hierarchical organisation entails a high signalling overhead, which can be reduced if control information like bandwidth requests and grants or channel quality information are aggregated in the multihop relay node.

Each multihop relay node should be enabled to independently schedule the resources like bandwidth, time slot resources or code resources provided to it. This local scheduling procedure leads to decentralized (hierarchical) scheduling.

The multihop relay node might apply known fair scheduling schemes e.g. as proposed by H. Kim and Y. Han in: "A Proportional Fair Scheduling for Multicarrier Transmission Systems", IEEE Communication Letters, Vol. 9, No. 3, March 2005 for the local fair scheduling procedure.

The price of the decentralized scheduling would be that the local distribution of the resources of the multihop relay node would be not visible for higher level units, in particular for the base station scheduler.

As a consequence, the scheduling would be unfair if the base station scheduler would apply a standard fair scheduling scheme treating the multihop relay node in the same way as a local user equipment unit directly accessing the base station. The reason is that the many user equipment units hidden behind the multihop relay node would have to share the same amount of resources one single local user equipment device can dispose of.

III. SUMMARY OF THE INVENTION

One of the Objects of the invention is to provide a wireless telecommunication system, in particular of cellular type, wherein a global fair scheduling and/or a fair distribution of the available resources is possible.

The above object is achieved e.g. by a wireless telecommunication system according to claim 1, in particular including at least one Base Station (BS) for communicating with at least one multihop Relay Node (RN) using a wireless link of a first type. The wireless telecommunication system may further include at least one local user equipment unit located within a range of the base station using at least one wireless link of a second type. The wireless link of the first type is used to transmit a combined data flow encapsulating multiple individual data flows relating to different services and/or remote user equipment units from the multihop relay node to the base station.

According to a central aspect of the invention, the base station is further configured to receive at least one local fairness parameter from the multihop relay node and to execute a global fair scheduling procedure for determining a fair distribution of available radio resources of the base station. If local fairness parameter is used as a parameter in said global fair scheduling procedure, the fairness of local distribution of resources can be taken into account when assigning resources to the multihop relay node, such that a globally fair distribution of resources can be achieved.

In particular, the local fairness parameter represents a fairness of the distribution of radio resources of the relay node over the individual data flows in the combined data flow. These individual data flows correspond to the data flows passing the multihop relay node.

The global fair scheduling procedure seeks in to find a fair distribution of resources over the wireless links of the first type and the wireless links of the second type.

The global fair scheduling procedure just as the local fair scheduling procedure may apply any criterion like e.g. maxmin fairness or proportional fairness by signalling local fairness information upwards in the scheduling hierarchy.

In order to be able to transmit on the combined data flow, it is proposed that the base station is able to encapsulate said multiple individual data flows into said combined data flow when transmitting the data flows over the wireless link of the first type to the multihop relay node and/or to extract the multiple individual data flows from the combined data flow received from the multihop relay node over the wireless link of the first type.

According to a preferred embodiment of the invention, it is proposed that the global fair scheduling procedure comprises calculating an utility function depending on the scheduled data rates and using the utility function to optimise the fairness of the distribution of the radio resources under the constraint that the available radio resources are exploited. Any suitable linear or non-linear optimization method including Mote-Carlo Methods may be applied. The different nature of the at least two types of wireless links can be suitably taken into account, if the functional dependence of the utility function on the resources assigned to the wireless link of the first type differs from the functional dependence of the utility function on the resources assigned to the wireless link of the second type.

The invention applies to any wireless data transmission scheme suitable for multiplexed data transmission. Depending on the format, the radio resources to be fairly distributed comprise data rates, radio channels, time slots and/or code resources in one or more frequency bands. The utility function may e.g. comprise a sum of logarithms of the radio resource quantities assigned to the wireless links or a polynomial or heuristic approximation of such a sum.

A further aspect of the invention relates to a relay node for use in a Wireless Telecommunication System of the above described type. The relay node supports the wireless link of the first type to the base station and further wireless communication connections with user equipment units in the range of the relay node in order to forward at least one communication data flow between the user equipment unit and the Base station.

According to one central aspect of the invention, it is proposed that said multihop relay node is further configured to perform a local fair scheduling procedure in order to achieve a fair distribution of available radio resources of the relay node over the wireless link of the first type and the further wireless links. The multihop relay node calculates a local fairness parameter representing a fairness of the achieved distribution and transmits local fairness parameter upstream in the scheduling hierarchy to the base station.

A further aspect of the invention relates to a method for global fair scheduling in a wireless telecommunication system including at least one base station and least one multihop relay node and a wireless link of a first type there between and with at least one local user equipment unit located within a range of the base station and at least one wireless link of a second type between the base station and the local user equipment unit.

The method comprises in particular encapsulating multiple individual data flows relating to different services and/or remote user equipment units located within a range of the multihop relay node into a combined data flow on the wireless link of the first type.

In order to allow for a global fair scheduling, it is proposed e.g. that a local fairness parameter is calculated and transmitted to the base station by the relay node. The local fairness parameter represents a fairness of the distribution of radio resources of the relay node over the individual data flows in the combined data flow, wherein said global fair scheduling procedure for determining a fair distribution of available radio resources of the base station over the wireless links connecting to the base station. The global fair scheduling procedure uses the local fairness parameter as a parameter.

Further essential features of the invention and advantages thereof will become apparent from the following description of an embodiment of the invention together with the attached figure. The embodiment is given for explanatory reasons and shall not limit the scope of the invention as defined in the attached claims in any way.

IV. BRIEF DESCRIPTION OF THE DRAWINGS

FIG. 1 shows a wireless telecommunication system including a base station and one multihop relay node and multiple User Equipment devices.

V. DETAILED DESCRIPTION OF ONE EMBODIMENT

FIG. 1 shows a wireless telecommunication system including one Base Station BS for communicating with at least one multihop Relay Node RN by using a wireless link 10 of a first type. The system further comprises multiple local User Equipment UE(local) unit located within a range of the base station BS. The local UEs access a core network directly via the base station BS using wireless link 12 of a second type. The wireless link 10 of the first type is used to transmit a combined data flow encapsulating multiple individual data flows relating to different services and/or remote user equipment units UE(remote) located within a coverage area of the multihop relay node RN.

The base station BS has a base station scheduler (not shown) being configured to receive a local fairness parameter from the multihop relay node RN. The local fairness parameter represents a fairness of the distribution of radio resources of the relay node RN over the individual data flows in the combined data flow in the wireless link 10.

In the wireless link 10 of the first type, the signalling of bandwidth requests and grants as well as Channel Quality Information (CQI) feedback can be aggregated, also Hybrid Automatic Retransmission Requests (H-ARQ) and its signalling is terminated in the multihop relay node since H-ARQ works link-by-link and not on end-to-end.

The multihop relay node RN supports the wireless link 10 of the first type to the base station BS and provides further wireless communication connections with the User Equipment (UE) Units remote from the base station BS located within the range of the relay node RN in order to forward the communication data flows from and to the remote UEs and the base station BS.

The multihop relay node RN performs periodically a local fair scheduling procedure in order to achieve a fair distribution of available radio resources of the relay node RN over the wireless link 10 of the first type and the further wireless links 14 to the remote user equipment units UE. Using a suitable processor, the multihop relay node RN calculates a local fairness parameter representing a fairness of the achieved distribution and to transmit said local fairness parameter to the base station BS.

Each multihop relay node (RN) signals its actual local fairness value, which is the value of the utility function for the chosen scheduling decision to the base station and in general upwards in the scheduling hierarchy.

Fairness information exchange can be implemented with different scheduling criteria (e.g. max-min fairness, proportional fairness) and different algorithm implementations calculating a resource allocation to maximize or minimize the corresponding utility function.

Utility functions have the property that they are monotoneously increasing with the data rates for each user (a higher rate gives higher utility) and that they are concave, meaning that additional 20 Kbit/s have a lower marginal utility for a user that already has 5 MBit/s than for a user that only has 50 Kbit/s.

From a point of view of statistical physics, the utility function can be construed as generating functions of thermodynamic potentials to be extremalized under the constraint of the available resources. If the values of the resources assigned to the individual data flows are regarded as degrees of freedom, the utility function may correspond e.g. to the thermodynamic entropy of the system and the constraint corresponds to the entropy of the system. The additivity of the utility function guarantees good scalability properties of the global fair scheduling procedure.

Examples for applicable scheduling criteria are max-min fairness, which maximizes the minimum data rate a user gets, and proportional fairness, which provides a higher data rate to users with better channel quality (compromise between efficiency and fairness).

Max-min fair scheduling chooses:

$$S = \arg\max\{\min(R_j)\}$$

if $R_j$ is the rate allocated to user/flow/bearer j. In other words, the minimum data rate assigned to one user is maximized. Proportional fair scheduling chooses:

$$S = \arg\max\left\{\sum_{j=1}^{n} \log(R_j)\right\}$$

where the singularity of the logarithm at zero guarantees that all users are scheduled. The function arg max is the is a functional mapping a function onto the value of its argument in its maximum.

Fair scheduling uses two mappings: First for every possible allocation it is possible to derive the data rate each user gets, wherein the data rate is an example of a resource to be allocated. Second, for the derived set of data rates, the value of the utility function can be determined.

Actual scheduling algorithms might use the existence of the two mappings implicitly.

The following description relates to an example for an implementation of the fair scheduling procedure, where criterion applied is proportional fairness.

The multihop relay node RN signals a value of the local utility function as a local fairness parameter F back to the base station BS. The local fairness parameter F is the average utility per bit which was achieved by local scheduling in the last scheduling interval, i.e.

$$F = \left[\sum_{i=1}^{k} \log(R_i)\right] / \sum_{i=1}^{k} R_i$$

over the local data flows i=1 ... k in the further wireless links 14, with $R_i$ being the rate for flow i and k being the total number of individual data flows bundled in the combined flow in the wireless link 10 and passing the multihop relay node RN.

The base station BS executes a global fair scheduling procedure for determining a fair distribution of available radio resources of the base station BS over said at least one wireless link 10 of the first type and said at least one wireless link 12 of the second type. The local fairness parameter F is used as a parameter in this global fair scheduling procedure, which could be implemented as follows.

Let the aggregated data rate for the multihop relay node/for the wireless link 10 of the first type in the next scheduling interval be $R_r$. The aggregated data rate of the combined data flow is to be determined according to the global fair scheduling procedure. The mapping to a utility value for the global fair scheduling procedure is done in the base station scheduler as $$U_r = F \cdot R_r$$

with F determined as explained above. If the multihop relay node gets the same amount of data in the next scheduling interval, the utility value is exact in the sense that the resulting distribution will be completely fair in that every individual data flow irrespective on whether or not it is comprised in the combined data flow on the wireless link 10 of the first type will have the same amount of resources. If not, it is an approximation: the utility function is linearized by assuming constant marginal utility per bit.

The global scheduling is done by use of the global utility value for the next scheduling interval:

$$U_{global} = F \cdot R_r + \sum_n (\log R_n)$$

where n is an index for all flows of local user equipment units to the base station not passing any multihop relay node RN.

In a more general scenario where a number m of multihop relay nodes is liked to the base station, the multihop relay node with the index j having transmitted the local fairness parameter $F_j$ and being assigned to an aggregated data rate $Rr_j$, the global utility function to be maximized by varying the data rates $Rr_j$ and $R_n$ would take the form $$U_{global} = \sum_{j=1}^{m} F_j \cdot Rr_j + \sum_n (\log R_n)$$

The constraint can be expressed as $$\sum_j Rr_j + \sum_n R_n = C$$

Where C corresponds to the maximum available resources.

The global fairness/efficiency criterion can be achieved with a large reduction in (multihop) signalling overhead at the expense of only a few bits for local fairness parameter signalling.

As explained above, local fairness information (e.g. in form of values of the local utility function) are exchanged between the nodes of the system. Fairness information sent by a multihop relay node RN describes its aggregated flows and can thus be used by the scheduler of the feeding base station BS to achieve its global scheduling criterion. The invention thus enables hierarchical (decentralized) fair scheduling with multihop relay nodes RN.

The invention can be easily generalized to multi-level hierarchies including lower level multihop relay nodes RN being connected to higher level multihop relay nodes RN by implementing the functions of the above described base station scheduler in the higher level multihop relay RN node.

The invention claimed is:

1. An apparatus comprising:
   at least one processor;
   memory storing computer program code;
   wherein the memory storing the computer program code is configured to, with the at least one processor, cause the apparatus to at least:
   receive at least one local fairness parameter originating at a multihop relay node with which a base station communicates using a wireless link of a first type, the base station also communicating with at least one user device using a wireless link of a second type, wherein said local fairness parameter represents the fairness of a distribution of radio resources of the multihop relay node over individual data flows in a combined data flow comprising multiple individual data flows relating to one or more of different services provided by a wireless network and user devices served by the wireless network, wherein the local fairness parameter is obtained through periodic performance of a local fair scheduling procedure; and
   execute a global fair scheduling procedure for determining a fair distribution of available radio resources of a base station over said at least one wireless link of the first type and said at least one wireless link of the second type, wherein the local fairness parameter is used as a parameter in said global fair scheduling procedure, wherein said global fair scheduling procedure comprises calculating a utility function depending on the scheduled data rates and using the utility function to optimize the fairness of the distribution of the radio resources under the constraint that the available radio resources are exploited and wherein values of the utility function are exchanged between nodes.

2. The apparatus according to claim 1, wherein the base station is further configured to:
  encapsulate said multiple individual data flows into said combined data flow when transmitting the data flows over the wireless link of the first type to the multihop relay node or to
  extract multiple individual data flows from a combined data flow received from the multihop relay node over the wireless link of the first type.

3. The apparatus according to claim 1, wherein said global fair scheduling procedure applies a max-min fairness criterion.

4. The apparatus according to claim 1, wherein said global fair scheduling procedure applies a proportional fairness criterion.

5. The apparatus according to claim 1, wherein the functional dependence of the utility function on the resources assigned to the wireless link of the first type differs from the functional dependence of the utility function on the resources assigned to the wireless link of the second type.

6. The apparatus according to claim 1, wherein the radio resources comprise data rates and radio channels.

7. The apparatus according to claim 1, wherein the utility function comprises a polynomial series expansion of a sum of logarithms of the radio resources assigned to the wireless links.

8. An apparatus comprising:
  at least one processor;
  memory storing computer program code;
  wherein the memory storing the computer program code is configured to, with the at least one processor, cause the apparatus to at least:
  control a relay node to support a wireless link of a first type to a base station communicating with the relay node using the wireless link of the first type, and further control the relay node to support at least one further wireless link, with at least one user device within range of the relay node in order to forward at least one communication data flow between the user device and the base station;
  control the multihop relay node to periodically perform a local fair scheduling procedure directed to a fair distribution of available radio resources of the relay node over the wireless link of the first type and the at least one further wireless link, to calculate a local fairness parameter representing the fairness of the achieved distribution and to transmit said local fairness parameter to the base station, wherein said global fair scheduling procedure comprises calculating a local utility function depending on the scheduled data rates and using, the local utility function to optimize the fairness of the distribution of the radio resources under the constraint that the available radio resources are exploited and wherein values of the local utility function are exchanged between nodes.

9. The apparatus according to claim 8, characterized in that said local fairness parameter is determined by the value of the local utility function for the actual distribution of the radio resources.

10. A method for managing radio resources comprising:
  calculating a local fairness parameter to be transmitted to a base station by a relay node, said local fairness parameter representing a fairness of a distribution of radio resources of the relay node over individual data flows in a combined data flow, wherein each individual data flow relates to one of a service provided by a network or a user device served by the network, and wherein the combined data flow comprises an encapsulation of the individual data flows, wherein the local fairness parameter is obtained through periodic performance of a local fair scheduling procedure; and
  performing a global fair scheduling procedure for determining a fair distribution of available radio resources of the base station over said at least one wireless link of the first type and said at least one wireless link of the second type, wherein performing the global fair scheduling procedure uses the local fairness parameter, wherein said global fair scheduling procedure comprises calculating a utility function depending on the scheduled data rates and using the utility function to optimize the fairness of the distribution of the radio resources under the constraint that the available radio resources are exploited and wherein values of the utility function are exchanged between nodes.

* * * * *